United States Patent
Dry

(10) Patent No.: US 10,062,290 B2
(45) Date of Patent: Aug. 28, 2018

(54) CONVOY VEHICLE LOOK-AHEAD

(71) Applicant: Ford Global Technologies, LLC, Dearborn, MI (US)

(72) Inventor: Alan George Dry, Grosse Pointe Woods, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 216 days.

(21) Appl. No.: 14/970,939

(22) Filed: Dec. 16, 2015

(65) Prior Publication Data
US 2017/0178514 A1 Jun. 22, 2017

(51) Int. Cl.
G08G 1/00 (2006.01)
H04N 5/44 (2011.01)
G08G 1/096 (2006.01)
B60R 1/00 (2006.01)
G08G 1/0967 (2006.01)
H04L 29/08 (2006.01)
H04N 5/232 (2006.01)

(52) U.S. Cl.
CPC ............... G08G 1/20 (2013.01); B60R 1/00 (2013.01); G08G 1/09675 (2013.01); G08G 1/096716 (2013.01); G08G 1/096741 (2013.01); G08G 1/096791 (2013.01); G08G 1/22 (2013.01); H04L 67/00 (2013.01); H04N 5/23238 (2013.01); H04N 5/44 (2013.01); B60R 2300/80 (2013.01); H04N 5/23293 (2013.01)

(58) Field of Classification Search
None
See application file for complete search history.

(56) References Cited

U.S. PATENT DOCUMENTS

| | | | |
|---|---|---|---|
| 9,026,367 B2 | 5/2015 | Paek et al. | |
| 2008/0203147 A1* | 8/2008 | Skaaksrud | G06Q 10/08 235/375 |
| 2010/0021011 A1 | 1/2010 | Shida | |
| 2011/0095908 A1* | 4/2011 | Nadeem | B60H 3/00 340/905 |
| 2012/0068858 A1 | 3/2012 | Fredkin | |

(Continued)

FOREIGN PATENT DOCUMENTS

| EP | 1213182 | 10/2001 |
|---|---|---|
| EP | 3103682 A1 | 12/2016 |

(Continued)

OTHER PUBLICATIONS

UK Search Report dated Mar. 22, 2017 (5 pages).

(Continued)

Primary Examiner — Reza Aghevli
(74) Attorney, Agent, or Firm — Frank A. MacKenzie; Bejin Bieneman PLC

(57) ABSTRACT

A computing device for a vehicle imaging system includes a data storage medium and a processing device programmed to execute computer-executable instructions stored on the data storage medium. The instructions include capturing an image of an area ahead of a host vehicle in a convoy with at least one other vehicle, wirelessly pairing with a mobile device associated with the at least one other vehicle, and presenting an image captured by the mobile device associated with the at least one other vehicle.

13 Claims, 4 Drawing Sheets

(56) References Cited

U.S. PATENT DOCUMENTS

| | | | |
|---|---|---|---|
| 2014/0309836 A1 | 10/2014 | Ollis | |
| 2014/0341434 A1 | 11/2014 | Lin et al. | |
| 2014/0375476 A1* | 12/2014 | Johnson | G08G 1/143 340/932.2 |
| 2015/0002620 A1* | 1/2015 | Shin | G06K 9/00805 348/36 |
| 2015/0081157 A1 | 3/2015 | Banasky, Jr. et al. | |
| 2015/0120181 A1 | 4/2015 | Puhler et al. | |
| 2015/0145995 A1 | 5/2015 | Shahraray et al. | |
| 2016/0110618 A1* | 4/2016 | Oba | G06K 9/00805 348/148 |
| 2016/0332574 A1* | 11/2016 | Park | H04N 7/181 |
| 2016/0362050 A1* | 12/2016 | Lee | B60R 1/00 |
| 2017/0046952 A1* | 2/2017 | Yang | G08G 1/0175 |

FOREIGN PATENT DOCUMENTS

| | | |
|---|---|---|
| WO | 2014145918 A1 | 9/2014 |
| WO | WO 2014137270 | 9/2014 |
| WO | WO 2014145918 | 9/2014 |
| WO | 2015009221 A1 | 1/2015 |

OTHER PUBLICATIONS

Beschizza, Rob, Pharos' GPS smartphones link cars in a convoy, Nov. 12, 2008.
Convey Technologies Videomatics Software; Videomatics; https://www.youtube.com/watch?v=OD1x0UNu4p8; accessed before Sep. 3, 2015.

* cited by examiner

CONVOY VEHICLE LOOK-AHEAD

BACKGROUND

Grouping vehicles into convoys or platoons can reduce traffic congestion. Operating a convoy, however, requires a fair amount of organization. Therefore, convoys are typically implemented in circumstances where coordination of the vehicles is possible, such as in a military or fleet vehicle context. Convoys can also be created in circumstances where vehicle drivers are in communication with one another. Truckers, for example, who can communicate over radio, will also sometimes travel in convoys.

DETAILED DESCRIPTION

Figure 1:
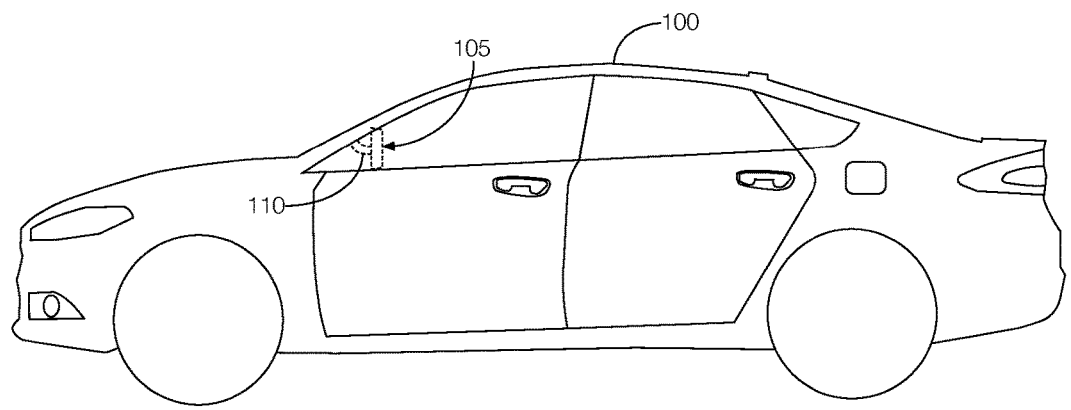
FIG. 1 illustrates an example host vehicle with an imaging system for capturing an image ahead of the host vehicle while travelling in a convoy.

Establishing an efficient convoy has historically required a fair amount of organization. Therefore, the benefits of convoys have been limited to the military, fleet vehicles, trucking, etc., where the operation of the vehicles can be coordinated ahead of time or via real-time communication among the drivers of the vehicles.

Passenger vehicles, however, are not able to enjoy the efficiencies of vehicle convoys since the vast majority of passenger vehicles are not equipped to facilitate communication with the drivers of other vehicles. Even though many vehicle occupants carry mobile phones that could be used to talk to other nearby vehicle occupants, and thereby establish an efficient convoy, doing so would require knowing the phone numbers of other occupants' mobile phone. Therefore, simply establishing an efficient convoy with other nearby passenger vehicles is difficult.

Further, even if a convoy could be established, speaking to other vehicle occupants over the phone does not permit the occupants of each vehicle to fully appreciate the benefits of riding in a convoy. For instance, voice communications over the phone do not permit the occupant of one vehicle to see a view of the road available to the occupant of another vehicle.

An example imaging system that can facilitate the establishment of a vehicle convoy via an ad hoc network includes various components that can be used to capture an image of an area ahead of a host vehicle in a convoy with at least one other vehicle, wirelessly pair with a mobile device associated with the at least one other vehicle, and present an image captured by the mobile device associated with the at least one other vehicle.

The ad hoc network created may permit vehicles to seamlessly enter and exit the convoy, as well as permit the occupants of one vehicle to see images captured from other vehicles. Such images may be used to assess traffic ahead of the host vehicle. That is, the images can be used to determine whether any lanes are closed, whether there is debris in the road, whether any points of interest are ahead of the host vehicle, etc. Further, the imaging system may generate an overhead view of the convoy that maps each vehicle in the convoy and may further allow the occupant to select which image captured by a vehicle in the convoy to view.

Each vehicle in the convoy with the disclosed imaging system may be able to see a real-time image, including video, of a view ahead of any other vehicle in the convoy. Each imaging system may broadcast its captured video to nearby vehicles using a short-range radio, as well as received video captured by other vehicles in the convoy. Further, the imaging system may encode location data, such as GPS data into its signals. The GPS data may be further used to determine which nearby vehicles are in the convoy and which are not in the convoy. Further, if a vehicle in the convoy does not include the imaging system, a nearby vehicle with an imaging system may be close enough to provide a sufficient image.

The elements shown may take many different forms and include multiple and/or alternate components and facilities. The example components illustrated are not intended to be limiting. Indeed, additional or alternative components and/or implementations may be used. Further, the elements shown are not necessarily drawn to scale unless explicitly stated as such.

As illustrated in FIG. 1, the host vehicle 100 includes an imaging system 105 that can establish an ad hoc network with other vehicles while travelling in a convoy. The imaging system 105 may be programmed to capture an image of an area ahead of the host vehicle 100, wirelessly pair with the other vehicles in the convoy, transmit the captured image to the other vehicles, and receive and present images captured by imaging systems 105 used by the other vehicles in the passenger compartment of the host vehicle 100.

In some possible implementations, the imaging system 105 may be programmed to transmit location data, determined by a navigation device, to the other vehicles in the convoy. The location data may represent the geographic location of the host vehicle 100. Moreover, the imaging system 105 may be programmed to receive location data representing the location of the other vehicles in the convoy. In one possible approach, the location data may include Global Positioning Satellite (GPS) location data.

With the location data, the imaging system 105 can determine where the host vehicle 100 is located in the convoy. Further, the imaging system 105 may be programmed to generate an overhead view of the convoy using the location data. From the overhead view, the imaging system 105 may be programmed to receive a user input selecting one of the vehicles in the convoy. In response to the user input, the imaging system 105 may be programmed to present the image captured by the imaging system 105 incorporated into the selected vehicle. Thus, the occupant of the host vehicle 100 can see the area ahead of any vehicle in the convoy.

The imaging system 105 may be incorporated into the host vehicle 100. For instance, the imaging system 105 may include cameras embedded in the vehicle fascia and may rely on data captured by various electronic units already incorporated into the host vehicle 100 such as a body control module, an infotainment system controller, or the like. Alternatively, the imaging system 105 may be implemented via a separate computing device, such as a mobile device, wearable device, tablet computer, laptop computer, navigation device, etc., brought into the host vehicle 100 and mounted to, e.g., the vehicle windshield or instrument panel via, e.g., a bracket 110.

Each time a new vehicle enters the convoy, the imaging system 105 may be programmed to detect the new vehicle and wirelessly pair with the imaging system 105 associated with the new vehicle. The wireless pairing may occur regardless of whether the imaging system 105 is incorporated into the vehicle or implemented via a mobile device brought into the vehicle. If the new vehicle does not incorporate an imaging system 105, or if the new vehicle is out of wireless communication range, the new vehicle may be detected via, e.g., a vehicle-to-vehicle communication protocol, such as the dedicated short range communication (DSRC) protocol. That is, if the new vehicle does not have an imaging system 105, one vehicle in the convoy may detect the new vehicle using on-board vehicle sensors, the imaging system 105, or the like, and transmit messages via DSRC to one or more other vehicles in the convoy. Those vehicles, in turn, may also transmit messages to nearby vehicles that indicate that a new vehicle has joined the convoy. The messages may further include the location of the new vehicle in the convoy.

If the new vehicle has an imaging system 105, the imaging system 105 of the new vehicle may be programmed to broadcast messages requesting a pairing with the imaging systems 105 of other nearby vehicles. Those nearby vehicles may, in turn, transmit messages to other nearby vehicles indicating the presence and location of the new vehicle.

Further, the imaging system 105 may be programmed to periodically transmit its location data to one or more other vehicles in the convoy. When the imaging system 105 receives location data from a nearby vehicle, it may transmit that location data to other nearby vehicles. Therefore, the imaging systems 105 may periodically update their locations, transmit its updated location to other nearby vehicles, and transmit location updates received from other nearby vehicles so that each vehicle in the convoy can have a relatively up-to-date status of the location of each vehicle in the convoy.

Although illustrated as a sedan, the host vehicle 100 may include any passenger or commercial automobile such as a car, a truck, a sport utility vehicle, a crossover vehicle, a van, a minivan, a taxi, a bus, etc. In some possible approaches, the host vehicle 100 is an autonomous vehicle configured to operate in an autonomous (e.g., driverless) mode, a partially autonomous mode, and/or a non-autonomous mode.

Figure 2:
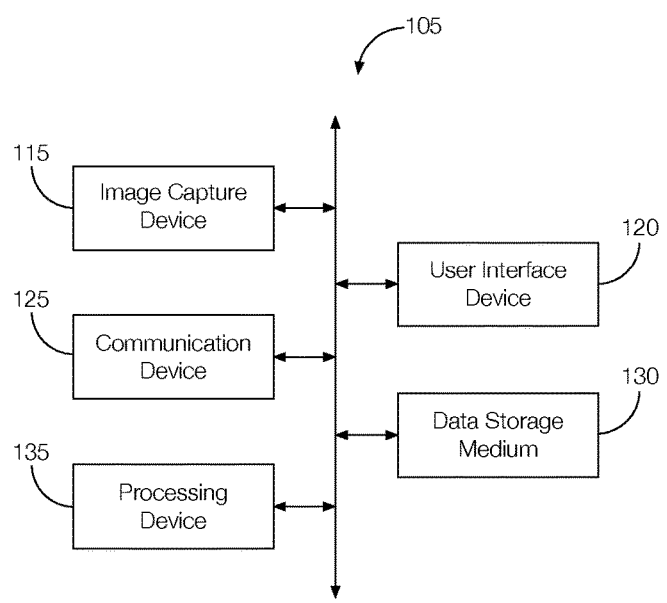
FIG. 2 is a block diagram illustrating example components of the imaging system incorporated into the vehicle of FIG. 1.

Referring now to FIG. 2, the imaging system 105 includes an image capture device 115, a user interface device 120, a communication device 125, a data storage medium 130, and a processing device 135.

The image capture device 115 may include any number of electronic devices that can capture an image of an area ahead of the host vehicle 100. For instance, the image capture device 115 may include a camera or any other type of visions sensor. The image capture device 115 may be programmed to output any images captured so that, e.g., the images may be viewed on the user interface device 120 or transmitted to the imaging systems 105 of other vehicles.

The user interface device 120 may include any number of electronic devices that can present information to an occupant of the host vehicle 100 or other user of the imaging system 105. For instance, the user interface device 120 may be used to present the images captured by the image capture device 115 of the area ahead of the host vehicle 100 or images captured by image capture devices 115 incorporated into other vehicles in the convoy. In addition, the user interface device 120 may be programmed to generate and present an overhead view of the vehicles in the convoy. The overhead view may include various images showing the vehicles in the convoy in relation to one another. For instance, the overhead view may not be an actual birds-eye view, but rather a "virtual" birds-eye view using icons for each vehicle in the convoy. The icons may be organized according to the location data associated with each vehicle in the convoy.

In some possible implementations, the user interface device 120 may be programmed to receive user inputs. Therefore, the user interface device 120 may include a display screen, buttons, etc., for presenting information to the user and for receiving user inputs. The user interface device 120 may also or alternatively include a touch-sensitive display screen that can both present information and receive user inputs. For example, while presenting the overhead view, the user interface device 120 may be programmed to receive a user input that selects one of the vehicles in the convoy. In response, the user interface device 120 may be programmed to present the image, if any, captured by the selected vehicle in the convoy.

The communication device 125 may include any number of electronic devices that can facilitate communication with imaging systems 105 of other vehicles. For instance, the communication device 125 may be programmed to wirelessly pair with the imaging systems 105 incorporated into the other vehicles in the convoy. When wirelessly paired, the communication device 125 may be programmed to transmit messages to, and receive messages from, imaging systems 105 associated with other vehicles in the convoy. The messages transmitted to other imaging systems 105 may include location data, the images captured by the image capture device 115 of the area ahead of the host vehicle 100, and possibly other information. The messages received from the other imaging systems 105 may include the location data and images captured by the imaging systems 105 implemented by other vehicles in the convoy. Further, the communication device 125 may be programmed to detect when a new vehicle enters the convoy or when a vehicle leaves the convoy. In response to detecting a new vehicle in the convoy, the communication device 125 may be programmed to wirelessly pair with the imaging system 105 associated with the new vehicle, assuming the new vehicle is within range of the communication device 125. If the imaging system 105 of the new vehicle is out of range of the communication device 125, the communication device 125 may be programmed to acknowledge the presence of the new vehicle based on, e.g., messages transmitted from other vehicles that are in the convoy and within communication range of the new vehicle.

The data storage medium 130 may include any number of electronic devices that can store data, including computer-executable instructions. The data storage medium 130 may make such instructions accessible to other components of the imaging system 105. Further, the data storage medium 130 may be used to store the images captured by the image capture device 115, messages received via the communication device 125, messages received from other vehicles in the convoy, etc.

The processing device 135 may include any number of electronic devices that can process signals and generate commands for the other comments in the imaging system 105. For instance, the processing device 135 may receive images captured by the image capture device 115 and store the images in the data storage medium 130. Further, the processing device 135 may be programmed to receive the user inputs provided to the user interface device 120 and command components such as the user interface device 120, communication device 125, and data storage medium 130 to respond accordingly. For instance, in response to the user input selecting a vehicle in the convoy (from, e.g., the overhead view), the processing device 135 may be programmed to command the user interface device 120 to present the image captured by the selected vehicle. Commanding the user interface device 120 to present the image may include, e.g., retrieving the image from the data storage medium 130, commanding the communication device 125 to request the image from the selected vehicle, or the like.

In some possible implementations, the processing device 135 may be programmed to communicate with other systems incorporated into the host vehicle 100, the imaging system 105, or both. For instance, the processing device 135 may be programmed to determine a location of the host vehicle 100 from, e.g., a navigation system incorporated into the host vehicle 100, the imaging system 105, or both. Thus, the processing device 135 may be programmed to receive location data associated with the present location of the host vehicle 100 and transmit the location data to the user interface device 120, the communication device 125, the data storage medium 130, etc.

Figure 3:
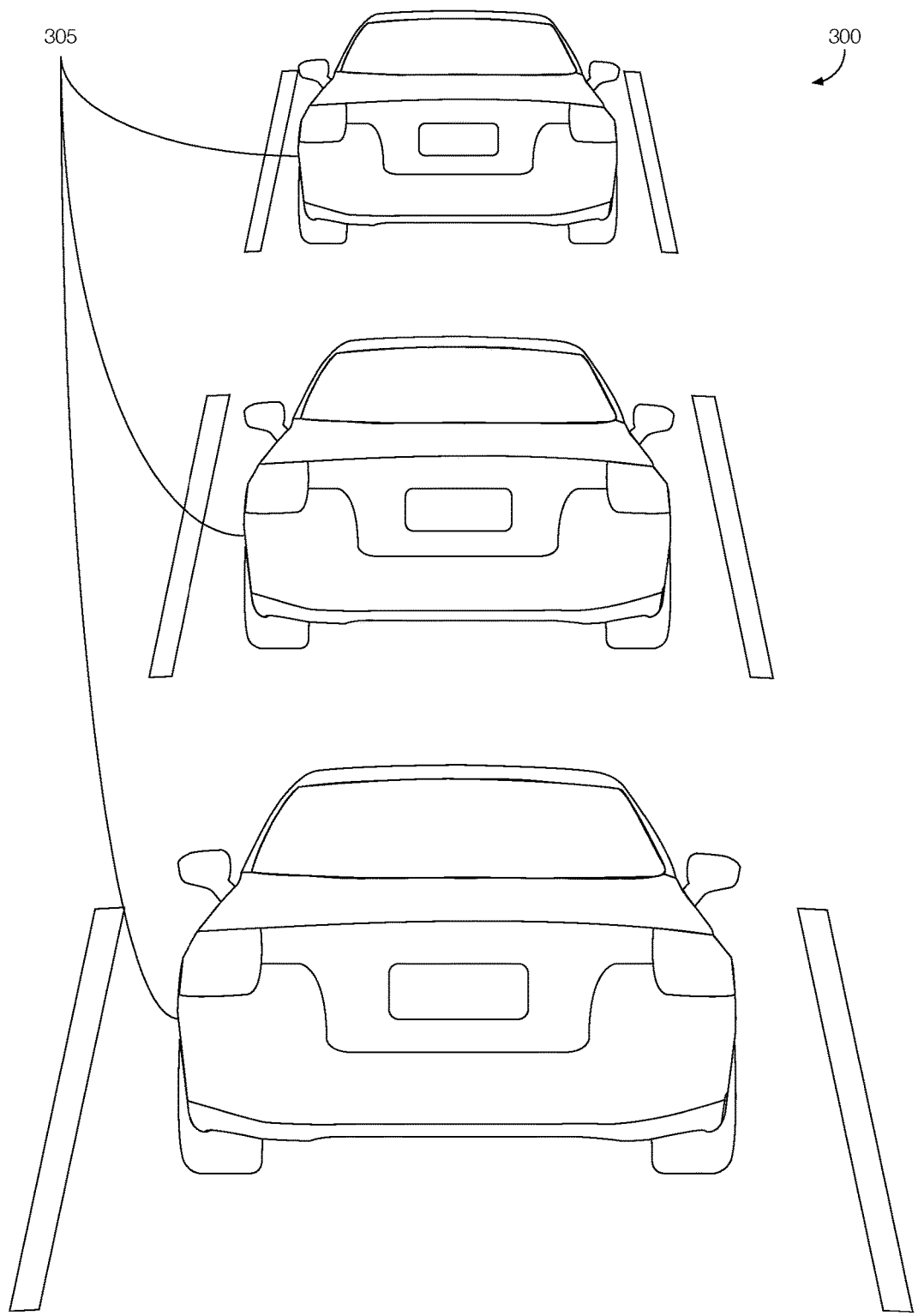
FIG. 3 illustrates an example vehicle convoy.

FIG. 3 illustrates an example vehicle convoy 300. The convoy 300 may be created any time two or more vehicles are traveling in tandem and relatively close to one another, such as within two to five car lengths, although other ranges are possible, especially with autonomous vehicles where the vehicles may be operated in close proximity. The convoy illustrated in FIG. 3 includes three vehicles (collectively, 305). One or more of the vehicles 305 may include the imaging system 105 described above. The occupants of any of the three vehicles 305 may provide a user input to see the image, such as a live video stream, of the view ahead of any of the other vehicles. If one of the vehicles 305 does not include the imaging system 105, and if that vehicle is selected via the user input, the live video stream of the closest vehicle 305 in front of or behind the selected vehicle may be shown as an alternative.

Figure 4:
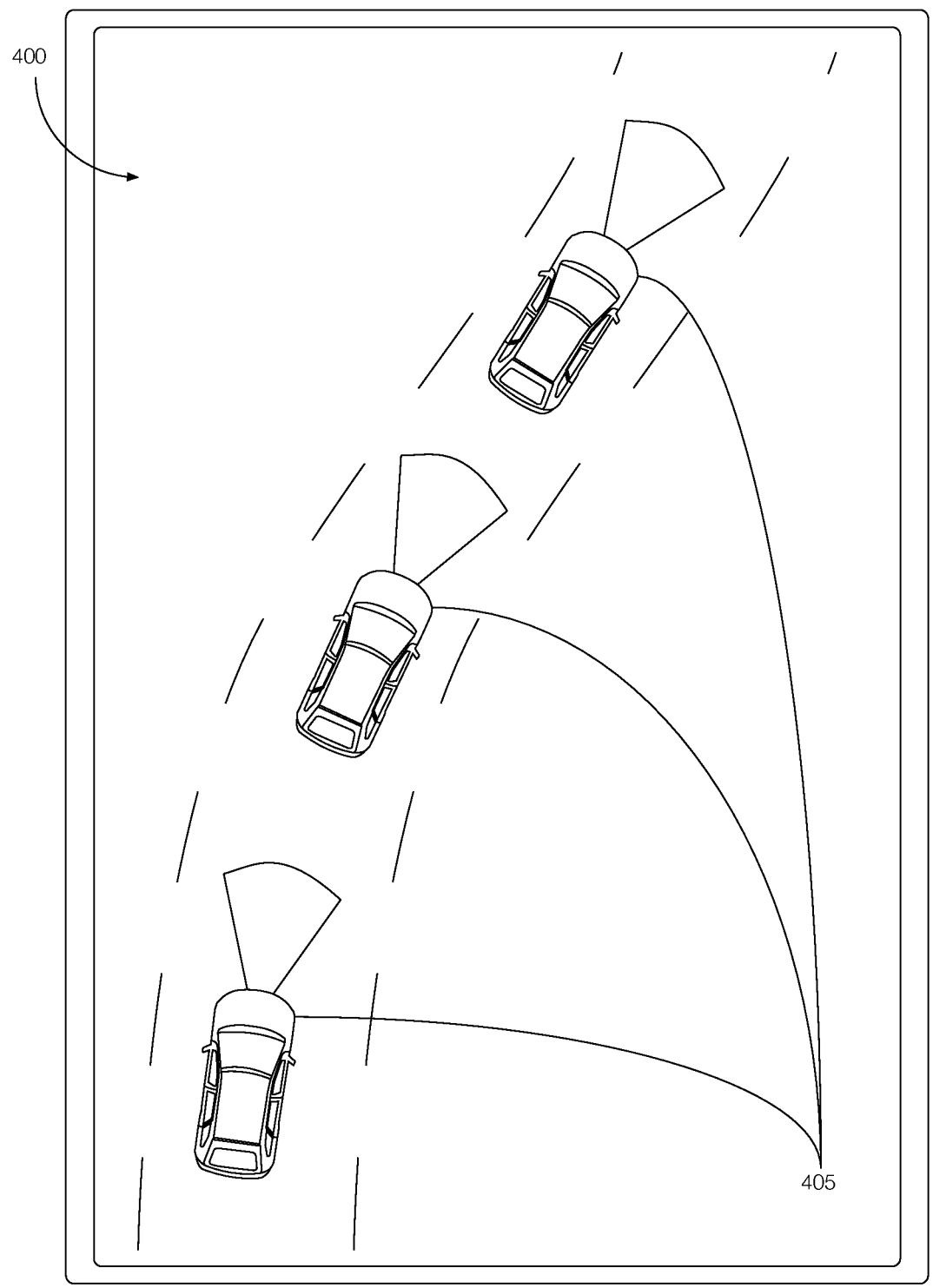
FIG. 4 illustrates a graphical representation of an overhead view of the convoy that may be generated by the imaging system.

FIG. 4 illustrates a graphical representation of an overhead view 400 of the convoy that may be generated by the imaging system 105. Instead of providing real-time images (such as a video stream), the overhead view 400 may be a virtual view that is simulated based on the location data received by the imaging system 105 in the host vehicle 100. The overhead view 400 may include icons (collectively, 405) associated with each of the vehicles. The icons 405 may indicate where each vehicle in the convoy is located relative to the other vehicles in the convoy. The icon 405 for the host vehicle 100 (i.e., the vehicle with the imaging system 105 that generated the overhead view 400) may have, e.g., a different color or shape to distinguish it from the icons 405 for the other vehicles in the convoy. Further, because generating the overhead view 400 involves the location data transmitted by the other vehicles in the convoy, the overhead view 400 may represent the spatial relationship between the various vehicles as well as exclude nearby vehicles that are not in the convoy, such as vehicles in other lanes, vehicles travelling in a different direction such as cross-traffic vehicles or vehicles on the opposite side of the road, etc.

The overhead view 400 may be presented via the user interface device 120. Each icon 405 may be selectable via, e.g., a user input. When the user input selecting one of the icons 405 is provided, the view on the user interface device 120 may switch to a live stream of the images, such as a video, captured by the selected vehicle. Another user input may be provided that returns the view to the overhead view 400. The overhead view 400 may be updated in real time in accordance with the location data received and as vehicles enter and exit the convoy.

In one possible implementation, the user interface device 120 may present the overhead view 400 in a way that is scrollable. That is, the occupant may provide various user inputs that change the display of the overhead view 400 so that different portions of the overhead view 400 are visible on the user interface device 120. Moreover, the user interface device 120 may be programmed to receive user inputs that allow the occupant to zoom in or out on various parts of the overhead view 400.

While the icons 405 shown in FIG. 4 all show the same type of vehicle, the icons 405 may reflect the type of vehicle in the convoy. That is, the icon 405 may indicate whether the vehicle is a sedan, cross-over, SUV, truck, commercial truck, bus, etc. Updating the icons 405 based on the type of vehicle may help the occupant using the imaging system 105 better understand which part of the convoy is being presented on the user interface device 120.

Further, the icons 405 may further represent the area 410 ahead of each vehicle. The area 410 may indicate the certainty associated with a particular imaging system 105. That is, the area 410 may indicate which parts of the road are highly visible to the imaging system 105 of a particular vehicle based on, e.g., the angle of the image capture device 115, the type of lens used in the image capture device 115, etc. While the imaging system 105 may be able to capture images outside of the area 410, those images may be of lower quality.

Figure 5:
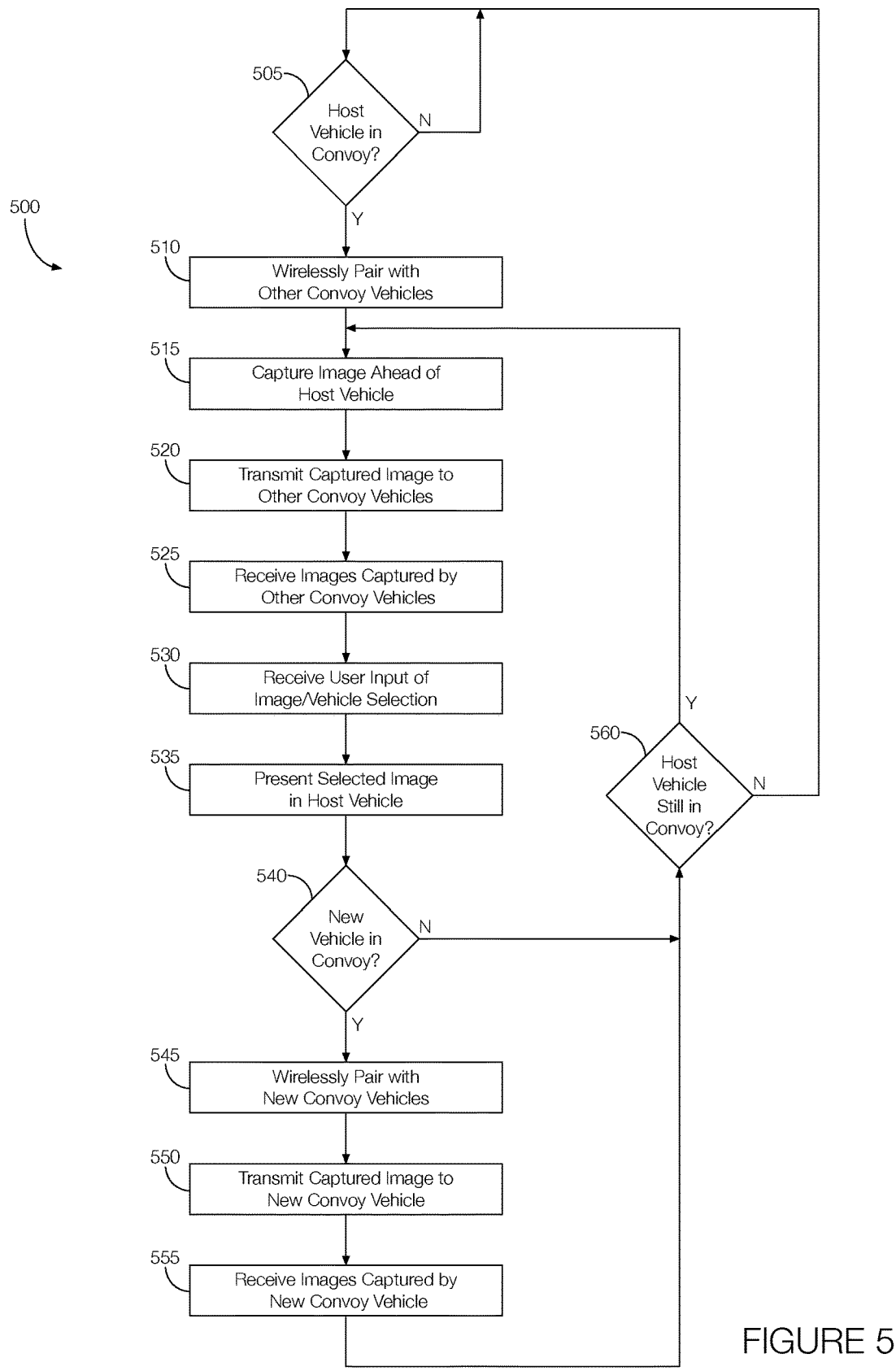
FIG. 5 is a flowchart of an example process that may be executed by the imaging system.

FIG. 5 is a flowchart of an example process 500 that may be executed by the imaging system 105. The process 500 may be initiated any time the host vehicle 100 is operating. The process 500 may continue to execute so long as the host vehicle 100 is operating.

At decision block 505, the imaging system 105 may determine whether the host vehicle 100 is in a convoy. The imaging system 105 may detect that the host vehicle 100 is in the convoy if, e.g., the imaging system 105 detects other vehicles, near the host vehicle 100, and that are travelling in the same lane and direction as the host vehicle 100. The image capture device 115 may capture images of lane markers and nearby vehicles, and the processing device 135 may process the images to determine whether the host vehicle 100 is in a convoy. If the host vehicle 100 is in a convoy, the process 500 may proceed to block 510. Otherwise, the process 500 may continue to execute block 505 until the convoy is detected.

At block 510, the imaging system 105 may attempt to pair with other vehicles in the convoy. That is, the communication device 125 may transmit messages to the other vehicles to establish a wireless communication channel. Once paired with the imaging systems 105 of the other vehicles in the convoy, the communication device 125 may regularly transmit location data to each of the other vehicles within range of the imaging system 105 of the host vehicle 100. The communication device 125 may further receive location data from one or more nearby vehicles in the convoy, and the location data may identify other vehicles in the convoy that are out of the range of the communication device 125.

At block 515, the imaging system 105 may begin to capture an image of an area ahead of the host vehicle 100. The image may include a live video stream. The image may be captured by, e.g., the image capture device 115. The image capture device 115 may output signals representing the image, and the signals may be processed by the processing device 135, transmitted to other vehicles via the communication device 125, or stored in the data storage medium 130.

At block 520, the imaging system 105 may transmit the captured images, such as the live video stream, to other vehicles in the convoy. For instance, using the dedicated short range communication (DSRC) or another vehicle-to-vehicle protocol, the communication device 125 may transmit the images captured by the image capture device 115 at block 515 to one or more other vehicles in the convoy. The communication device 125 may transmit the images to any vehicles in the convoy within wireless range of the communication device 125, and each vehicle that receives the images may broadcast the images to other vehicles in the convoy.

At block 525, the imaging system 105 may receive images, including live video streams, captured by one or more other vehicles in the convoy. The images may be received by the communication device 125 in accordance with a vehicle-to-vehicle communication protocol such as DSRC. In some instances, the communication device 125 may broadcast the images to one or more other vehicles in the convoy since those vehicles may be out of the communication range of the convoy vehicle that initially transmitted the images.

At block 530, the imaging system 105 may receive a user input selecting a convoy vehicle. For instance, while displaying the overhead view or otherwise presenting a graphical or textual representation of the vehicles in the convoy, the user interface device 120 may receive a user input selecting one of the convoy vehicles.

At block 535, the imaging system 105 may present the images, including a live video stream, captured by the convoy vehicle selected at block 540. The images may be presented via, e.g., the user interface device 120.

At decision block 540, the imaging system 105 may determine whether any additional vehicles have entered the convoy. For instance, the communication device 125 may receive a message from the new vehicle or a different convoy vehicle announcing the presence of the new vehicle in the convoy. In some implementations, the message may include location data representing the location of the new vehicle in the convoy. The processing device 135, therefore, may determine whether the new vehicle has entered the convoy based on the messages received at the communication device 125. Alternatively or in addition, the presence of the new vehicle may be detected via the image capture device 115. For instance, the image capture device 115 may capture an image of a new vehicle travelling in the same lane and in the same direction as the host vehicle 100. The new vehicle may also or alternatively be detected when, e.g., the new vehicle enters the same lane as the host vehicle 100 while also travelling in the same direction. The processing device 135 may process the images captured by the image capture device 115 to determine whether any of the images show a new vehicle enter the convoy. If a new vehicle is detected, the process 500 may proceed to block 545. Otherwise, the process 500 may proceed to block 560.

At block 545, the imaging system 105 may attempt to pair with the new vehicle in the convoy. That is, the communication device 125 may transmit messages to the new vehicle to establish a wireless communication channel. Once paired with the imaging systems 105 of the new vehicle in the convoy, the communication device 125 may regularly transmit location data to vehicles within range of the imaging system 105 of the host vehicle 100, which may include the new vehicle. The communication device 125 may further receive location data from the new vehicle in the convoy, and the location data may identify other vehicles in the convoy that are out of the range of the communication device 125.

At block 550, the imaging system 105 may transmit the captured images, such as the live video stream, to the new vehicle in the convoy. For instance, using the dedicated short range communication (DSRC) or another vehicle-to-vehicle protocol, the communication device 125 may transmit the images captured by the image capture device 115 at block 515 to the new vehicle. In turn, the new vehicle may broadcast the images captured by the image capture device 115 to other vehicles in the convoy. Moreover, the communication device 125 may transmit other images captured by other vehicles in the convoy to the new vehicle, especially if the new vehicle and the host vehicle 100 can communicate with different vehicles due to their different geographic locations in the convoy.

At block 555, the imaging system 105 may receive images, including live video streams, captured by the new vehicle in the convoy. The images may be received by the communication device 125 in accordance with a vehicle-to-vehicle communication protocol such as DSRC. In some instances, the communication device 125 may broadcast the images captured by the new vehicle to one or more other vehicles in the convoy since those vehicles may be out of the communication range of the new vehicle.

At decision block 560, the imaging system 105 may determine whether it is still in the convoy. For instance, the processing device 135 may be programmed to process the images captured by the image capture device 115 to determine whether the host vehicle 100 has left the convoy. That is, the processing device 135 may determine that the host vehicle 100 has left the convoy if, e.g., the host vehicle 100 is no longer in the same lane or in the same direction as the convoy vehicles. If the processing device 135 determines that the host vehicle 100 has left the convoy, the process 500 may proceed to block 505 so that a new convoy may be detected. If the processing device 135 determines that the host vehicle 100 is still part of the convoy, the process 500 may proceed to block 515.

With the example imaging system 105 described above, vehicles can seamlessly establish communication channels with convoy vehicles each time the host vehicle 100 enters a convoy. Further, the example imaging system 105 permits the occupants of one vehicle to see images, such as a live video stream, captured from other vehicles. Such images may be used to, e.g., determine whether any lanes are closed, whether there is debris in the road, whether any points of interest are ahead of the host vehicle 100, etc. Further, the example imaging system 105 may generate an overhead view of the convoy that maps each vehicle in the convoy and may further allow the occupant to select which image captured by a vehicle in the convoy to view In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A computing device comprising a data storage medium and a processing device programmed to execute computer-executable instructions stored on the data storage medium, the instructions including:
　　capturing an image of an area ahead of a host vehicle in a convoy with a plurality of other vehicles, each of the plurality of other vehicles having a mobile device;
　　receiving a user input selecting the other vehicle in the convoy;
　　wirelessly pairing with the mobile devices of each of the plurality of other vehicles in the convoy; and
　　displaying, on a user interface located in the host vehicle, an image captured by the mobile device of one of the plurality of other vehicles, wherein the image captured by the mobile device of the one of the plurality of other vehicles is displayed on the user interface of the host vehicle in response to receiving the user input selecting the one of the plurality of other vehicles in the convoy.

2. The computing device of claim 1, the instructions further including generating an overhead view of the host vehicle and the one of the plurality of other vehicles in the convoy.

3. The computing device of claim 2, the instructions further including receiving location data from the one of the plurality of other vehicles in the convoy.

4. The computing device of claim 3, wherein generating the overhead view of the host vehicle and the one of the plurality of other vehicles in the convoy is based at least in part on the location data received from the one of the plurality of other vehicles in the convoy.

5. The computing device of claim 1, the instructions further including wirelessly pairing with mobile devices associated with new vehicles that enter the convoy.

6. The computing device of claim 1, the instructions further including transmitting the image captured by the mobile device associated with the host vehicle to at least one of the plurality of other vehicles in the convoy.

7. A vehicle imaging system comprising:
an image capture device programmed to capture an image of an area ahead of a host vehicle in a convoy with a plurality of other vehicles, each of the plurality of other vehicles having an imaging system implemented via a mobile device;
a communication device programmed to wirelessly pair with the imaging system of the each of the plurality of other vehicles and receive images captured by the imaging systems of each of the plurality of other vehicles; and
a user interface device programmed to receive a user input selecting the one of the plurality of other vehicles in the convoy before the communication device wirelessly pairs with the imaging system of the one of the plurality of other vehicles and receives the image captured by the one of the plurality of other vehicles, and wherein the user interface device is further programmed to display, in the host vehicle, the image captured by the imaging system of the one of the plurality of other vehicles in response to the user interface receiving the user input selecting the one of the plurality of other vehicles in the convoy.

8. The vehicle imaging system of claim 7, wherein the user interface device is programmed to generate an overhead view of the host vehicle and the one of the plurality of other vehicles in the convoy.

9. The vehicle imaging system of claim 8, wherein the communication device is configured to receive location data from the one of the plurality of other vehicles in the convoy.

10. The vehicle imaging system of claim 9, wherein generating the overhead view of the host vehicle and the one of the plurality of other vehicles in the convoy is based at least in part on the location data received from the one of the plurality of other vehicles in the convoy.

11. The vehicle imaging system of claim 7, wherein the communication device is programmed to wirelessly pair with imaging systems associated with new vehicles that enter the convoy.

12. The vehicle imaging system of claim 7, wherein the communication device is programmed to transmit the image captured by the image capture device to one of the plurality of other vehicles in the convoy.

13. A method comprising:
detecting that a host vehicle has entered a convoy, the convoy including a plurality of other vehicles, each of the plurality of other vehicles having an imaging system implemented via a mobile device;
receiving a user input selecting the one of the plurality of other vehicles in the convoy;
wirelessly pairing with the imaging system of the one of the plurality of other vehicles in the convoy;
capturing an image of an area ahead of the host vehicle;
receiving an image captured by the imaging system of the one of the plurality of other vehicles; and
displaying, on a user interface device located in the host vehicle, the image captured by the imaging system of the one of the plurality of other vehicles as a result of receiving the user input selecting the one of the plurality of other vehicles in the convoy.

\* \* \* \* \*

UNITED STATES PATENT AND TRADEMARK OFFICE
CERTIFICATE OF CORRECTION

PATENT NO. : 10,062,290 B2
APPLICATION NO. : 14/970939
DATED : August 28, 2018
INVENTOR(S) : Alan George Dry Page 1 of 1

It is certified that error appears in the above-identified patent and that said Letters Patent is hereby corrected as shown below:

In the Claims

Column 12, Line 23 – before "one of the plurality", insert --at least--; and

Column 12, Line 30 – replace "selecting the one" with --selecting one--.

Signed and Sealed this
Third Day of November, 2020

Andrei Iancu
*Director of the United States Patent and Trademark Office*